United States Patent
Ishida

(10) Patent No.: US 11,095,793 B2
(45) Date of Patent: Aug. 17, 2021

(54) RECEPTION DEVICE AND METHOD TO TRANSMIT DATA BASED ON ONE OR MORE TABLES

(71) Applicant: TOSHIBA TEC KABUSHIKI KAISHA, Tokyo (JP)

(72) Inventor: Tetsuya Ishida, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/577,229

(22) Filed: Sep. 20, 2019

(65) Prior Publication Data

US 2021/0092253 A1   Mar. 25, 2021

(51) Int. Cl.
   *H04N 1/32* (2006.01)

(52) U.S. Cl.
   CPC ..... *H04N 1/32016* (2013.01); *H04N 1/32106* (2013.01); *H04N 2201/0094* (2013.01)

(58) Field of Classification Search
   CPC ........... H04N 1/32016; H04N 1/32106; H04N 220/0094; G06F 3/1224; G06F 3/1278; G06F 3/1229; B41J 3/46

USPC ................. 358/1.1–1.18, 474, 402
   See application file for complete search history.

(56) References Cited

U.S. PATENT DOCUMENTS

| | | | | |
|---|---|---|---|---|
| 6,801,340 | B1 * | 10/2004 | Endo ................. | G07B 17/0008 358/1.15 |
| 2002/0157028 | A1 * | 10/2002 | Koue ................. | H04N 1/00206 726/3 |
| 2008/0055659 | A1 * | 3/2008 | Uchida .............. | H04N 1/00212 358/400 |
| 2012/0293836 | A1 * | 11/2012 | Hiraike ............. | H04N 1/32021 358/1.15 |
| 2018/0088883 | A1 * | 3/2018 | Hashimoto .......... | G06F 3/1278 |

FOREIGN PATENT DOCUMENTS

| | | |
|---|---|---|
| JP | 2005-348259 A | 12/2005 |
| JP | 2017-073591 A | 4/2017 |

* cited by examiner

*Primary Examiner* — Gabriel I Garcia
(74) *Attorney, Agent, or Firm* — Foley & Lardner LLP

(57) ABSTRACT

According to one embodiment, a reception device receiving facsimile data includes an interface and a processor. The interface receives the facsimile data. The processor transmits a facsimile image of the facsimile data to a transfer destination corresponding to a transmission source transmitting the facsimile data.

12 Claims, 7 Drawing Sheets

FIG. 2

RELEVANT INFORMATION

| No | NAME | COMPANY NAME | DEPARTMENT NAME | GROUP NAME | ADDRESS |
|---|---|---|---|---|---|
| 1 | ABCD | ○×TRADING COMPANY | AA | BB | 111-111 |
| 2 | EFGH | ○×TRADING COMPANY | AA | CC | 222-222 |
| 3 | IJKL | △☐ CONSTRUCTION | DD | EE | 333-333 |
| 4 | MNOP | △☐ CONSTRUCTION | FF | GG | 333-333 |
| 5 | QRST | ** INDUSTRY | HH | II | aaa@a.b.co.jp |

RELEVANT INFORMATION

| No | NAME | COMPANY NAME | DEPARTMENT NAME | GROUP NAME | TRANSFER DESTINATION |
|---|---|---|---|---|---|
| 1 |  | △☐ CONSTRUCTION |  |  | bbb@b.c.co.jp |
| 2 | ABCD |  |  |  | FOLDER A |

⋮

| No | NAME | COMPANY NAME | DEPARTMENT NAME | GROUP NAME | ADDRESS |
|---|---|---|---|---|---|
| 3 | IJKL | △□ CONSTRUCTION | DD | EE | 333-333 |
| 4 | MNOP | △□ CONSTRUCTION | FF | GG | 333-333 |

| No | NAME | COMPANY NAME | DEPARTMENT NAME | GROUP NAME |
|---|---|---|---|---|
| 1 | | △□ CONSTRUCTION | | |
| 2 | ABCD | | | |

RELEVANT INFORMATION

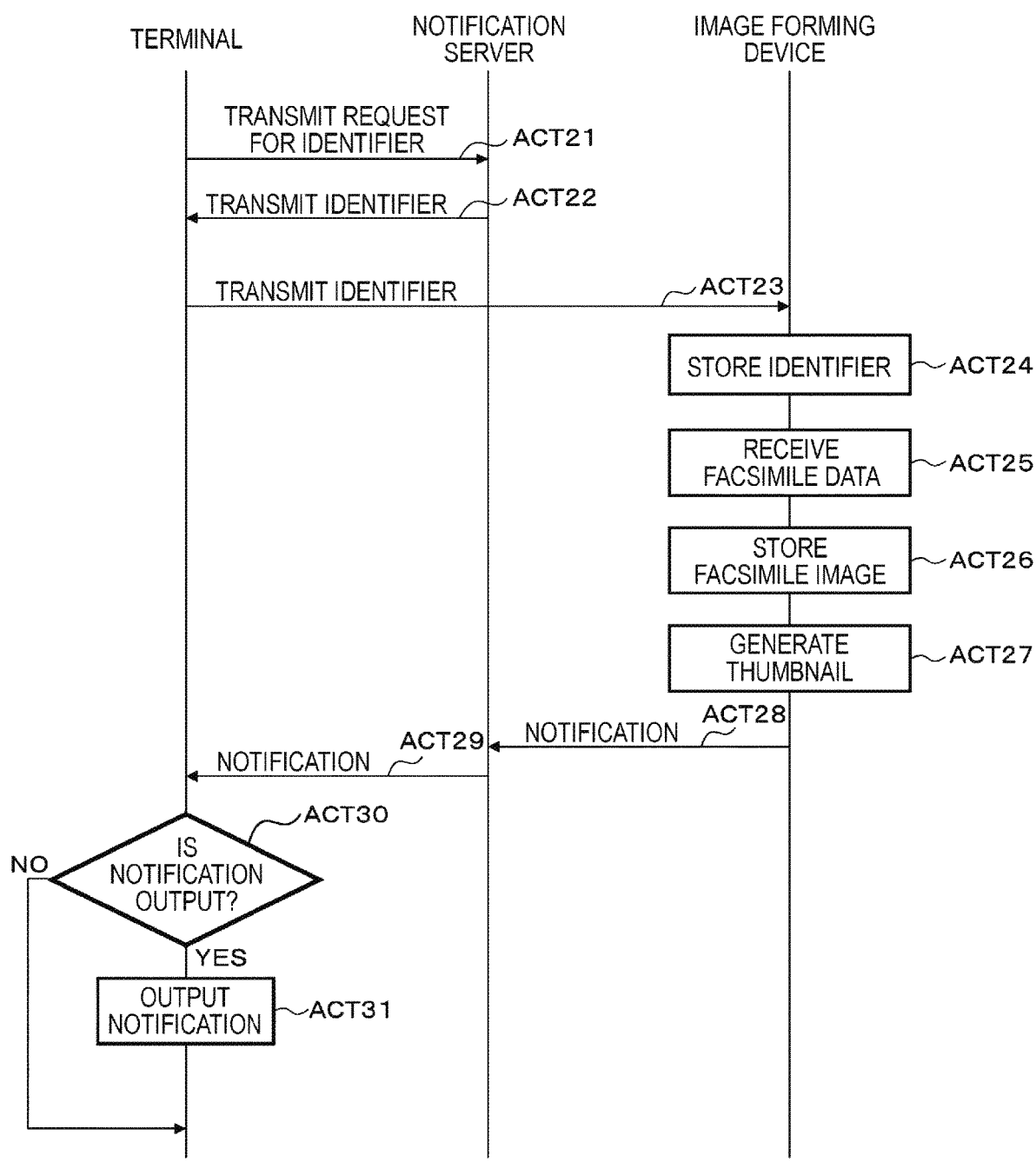

… (1) …

RECEPTION DEVICE AND METHOD TO TRANSMIT DATA BASED ON ONE OR MORE TABLES

FIELD

Embodiments described herein relate generally to a reception device, a storage medium, and a reception method.

BACKGROUND

Reception devices receiving facsimile data include a reception device that notifies a predetermined destination (transfer destination) of received facsimile data. For example, such a reception device previously opens a plurality of transfer mailboxes. The reception device transfers the received facsimile data to a transfer mailbox designated on a transmission source side.

In the related art, transfer destinations such as transfer mailboxes are required to be designated on transmission source sides in reception devices.

DESCRIPTION OF THE DRAWINGS

FIG. 2 is a diagram showing an example of an address table according to the first embodiment;

FIG. 3 is a diagram showing an example of a transfer destination table according to the first embodiment;

FIG. 11 is a sequence diagram showing an operation example of the fax system according to the second embodiment.

DETAILED DESCRIPTION

In general, according to one embodiment, a reception device includes an interface and a processor. The interface is configured to receive facsimile data. The processor is configured to transmit, based on an address table and a transfer destination table, a facsimile image of the facsimile data to a transfer destination corresponding to a transmission source transmitting the facsimile data.

Hereinafter, embodiments will be described with reference to the accompanying drawings.

First Embodiment

First, a first embodiment will be described.

An image forming device (reception device) according to the embodiment receives facsimile data. The image forming device receives facsimile data through a communication network such as a telephone line or the Internet. The image forming device transfers the received facsimile data to a predetermined transfer destination. In addition, the image forming device may be a device that prints an image (facsimile image) on the basis of facsimile data.

For example, the image forming device is formed as a multi-function printer that performs printing, scanning, copying, and the like.

Figure 1:
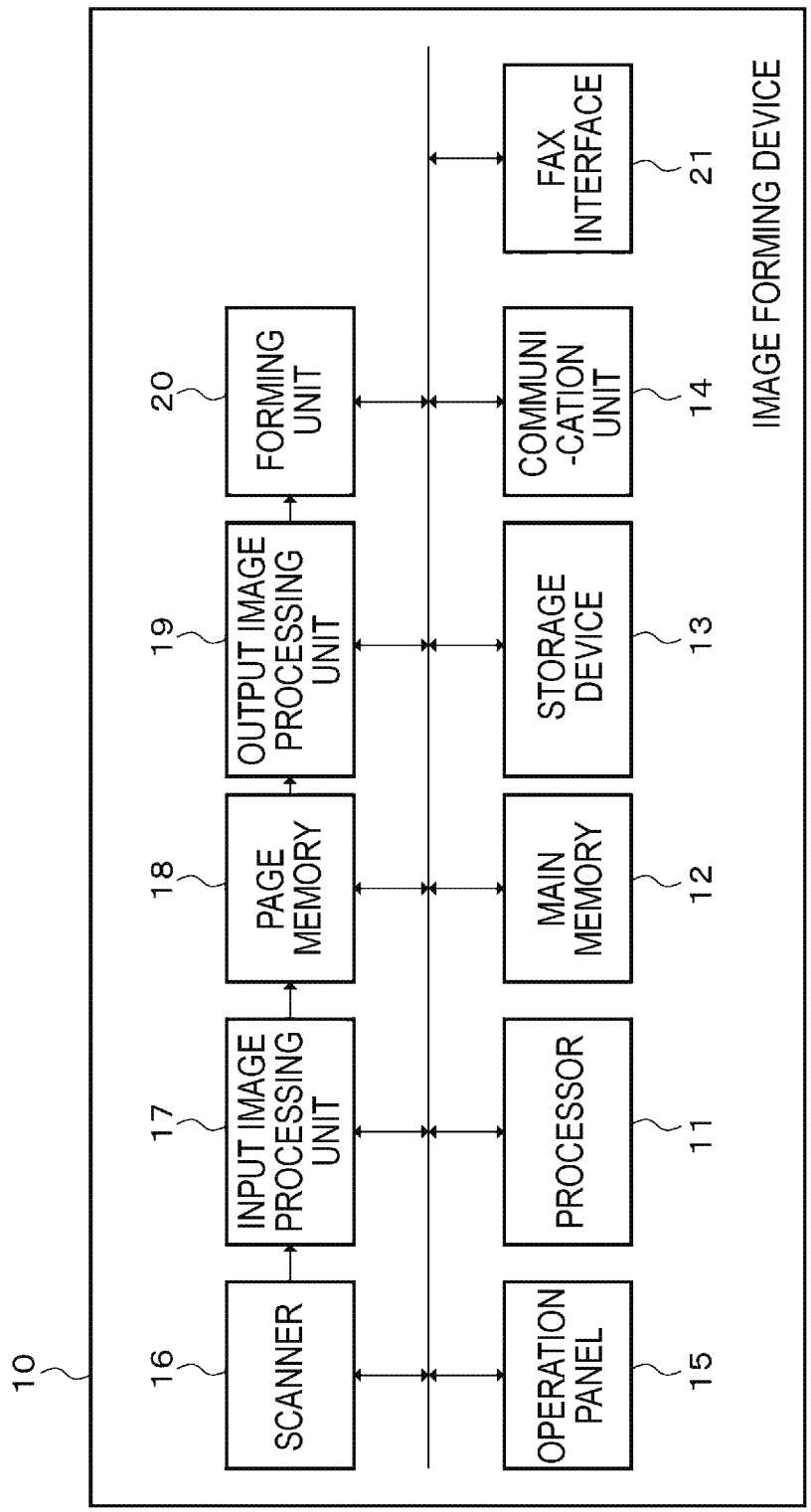
FIG. 1 is a block diagram showing a configuration example of an image forming device according to a first embodiment.

FIG. 1 is a block diagram showing a configuration example of an image forming device 10 according to the embodiment.

As shown in FIG. 1, the image forming device 10 includes a processor 11, a main memory 12, a storage device 13, a communication unit 14, an operation panel 15, a scanner 16, an input image processing unit 17, a page memory 18, an output image processing unit 19, a forming unit 20, a fax interface 21, and the like. These units are connected to each other through a data bus or the like. Meanwhile, the image forming device 10 may be configured to include a necessary configuration in addition to the configuration as shown in FIG. 1 or may be configured such that a specific configuration is excluded from the image forming device 10.

The processor 11 has a function of controlling the operation of the entire image forming device 1. The processor 11 may include an internal memory, various types of interfaces, and the like. The processor 11 realizes various processes by executing a program stored in the internal memory, the storage device 13, or the like in advance.

Meanwhile, some of various functions realized by executing a program by the processor 11 may be realized by a hardware circuit. In this case, the processor 11 controls functions executed by the hardware circuit.

The main memory 12 is a volatile memory. The main memory 12 is a working memory or a buffer memory. The main memory 12 stores various application programs on the basis of a command received from the processor 11. In addition, the main memory 12 may store data necessary for the execution of an application program, execution results of the application program, and the like.

The storage device 13 (storage unit) is a non-volatile memory in which data can be written and rewritten. The storage device 13 is constituted by, for example, a hard disk drive (HDD), a solid state drive (SSD), or a flash memory. The storage device 13 stores control programs, applications, various data, and the like in accordance with the purpose of operation of the image forming device 10.

In addition, the storage device 13 stores an address table and a transfer destination table. The address table and the transfer destination table will be described later.

The communication unit 14 is an interface for communicating with an external device. The communication unit 14 is connected to the external device through a network such as the Internet. For example, the communication unit 14 is an interface that supports connection through a wired or wireless local area network (LAN).

The operation panel 15 receives inputs of various operations from an operator. The operation panel 15 transmits a signal indicating an operation input by the operator to the processor 11. The operation panel 15 includes, for example, a keyboard, a numeric keypad, a touch panel, or the like as an operation unit.

In addition, the operation panel 15 displays various pieces of information to the operator. That is, the operation panel 15 displays a screen showing various pieces of information on the basis of a signal received from the processor 11. The operation panel 15 includes, for example, a liquid crystal display or the like as a display unit.

The scanner 16 optically scans a manuscript and reads an image of the manuscript as image data. The scanner 16 reads the manuscript as a color image. The scanner 16 is constituted by a sensor column formed in a main scanning direction, or the like. The scanner 16 moves the sensor column in a sub-scanning direction and reads the entire manuscript.

The input image processing unit 17 processes image data read by the scanner 16. Meanwhile, input image processing unit 17 may process image data received from units other than the scanner 16. For example, the input image processing unit 17 may process image data transmitted from a universal serial bus (USB) memory, a PC, a smartphone, and the like.

The page memory 18 stores image data processed by the input image processing unit 17.

The output image processing unit 19 processes image data stored in the page memory 18 so that the forming unit 20 can print the image data on a sheet.

The forming unit 20 prints image data processed by the output image processing unit 19 on a sheet on the basis of the control of the processor 11.

The forming unit 20 prints image data on a sheet using, for example, electrophotography. In addition, the forming unit 20 is constituted by a transfer body, a roller for driving the transfer body, an image forming unit forming an image on the transfer body, and the like.

The fax interface 21 is an interface that receives facsimile data from a transmission source. The fax interface 21 acquires an address of the transmission source, a facsimile image, and the like as facsimile data. The fax interface 21 transmits the address of the transmission source, the facsimile image, and the like to the processor 11.

For example, the fax interface 21 is an interface to be connected to a telephone line and the Internet.

In addition, the fax interface 21 may be formed integrally with the communication unit 14.

Next, the address table will be described.

The address table stores information relevant to a transmission source of facsimile data and an address of the transmission source in association with each other.

FIG. 2 shows a configuration example of the address table. As shown in FIG. 2, the address table stores relevant information and an "address" in association with each other.

The relevant information is information for identifying a transmission source. For example in FIG. 2, the relevant information can include at least one of: a "name", a "company name", a "department name", or a "group name."

The "name" is the name of a person who transmits facsimile data from the transmission source.

The "company name" is the name of a company to which the person belongs.

The "department name" is the name of a department to which the person belongs.

The "group name" is the name of a group to which the person belongs.

The relevant information may be configured to include a necessary configuration in addition to the configuration as shown in FIG. 2 or may be configured such that a specific configuration is excluded. The configuration of the relevant information is not limited to the specific configuration.

The "address" is an address used by the transmission source. When the transmission source transmits facsimile data through a telephone line, the "address" is a telephone number. In addition, when the transmission source transmits facsimile data through the Internet, the "address" is an email address.

The address table is stored in the storage device 13 or the like in advance. For example, the address table is stored in accordance with an operator's operation. In addition, the address table may be updated appropriately.

Next, the transfer destination table will be described.

The transfer destination table shows a transfer destination corresponding to relevant information. FIG. 3 shows a configuration example of a transfer destination table. As shown in FIG. 3, the transfer destination table stores relevant information and a "transfer destination" in association with each other.

The relevant information is as described above. Here, the relevant information is constituted by at least one element of a "name", a "company name", a "department name", and a "group name".

The "transfer destination" is a transfer destination to which facsimile data is transferred. The "transfer destination" is a transfer destination to which facsimile data received from a transmission source related to the corresponding relevant information is transferred. That is, the "transfer destination" is a transfer destination to which facsimile data received from a transmission source including elements of the corresponding relevant information is transferred.

For example, the "transfer destination" is an email address, a folder, or the like. When the "transfer destination" is an email address, the processor 11 transfers facsimile data to the email address. In addition, when the "transfer destination" is a folder, the processor 11 stores facsimile data in the folder. In addition, the folder may be a folder which is set within an external device.

In addition, the "transfer destination" may be another fax number (telephone number). In addition, the "transfer destination" may be a destination (for example, an email address) of facsimile data through the Internet. The configuration of the "transfer destination" is not limited to a specific configuration.

Next, functions realized by the image forming device 10 will be described. The functions realized by the image forming device 10 are realized by executing a program stored in the storage device 13 or the like by the processor 11.

First, the processor 11 has a function of generating a transfer destination table.

The processor 11 generates the transfer destination table in accordance with an input received from an operator.

Figures 4, 5:
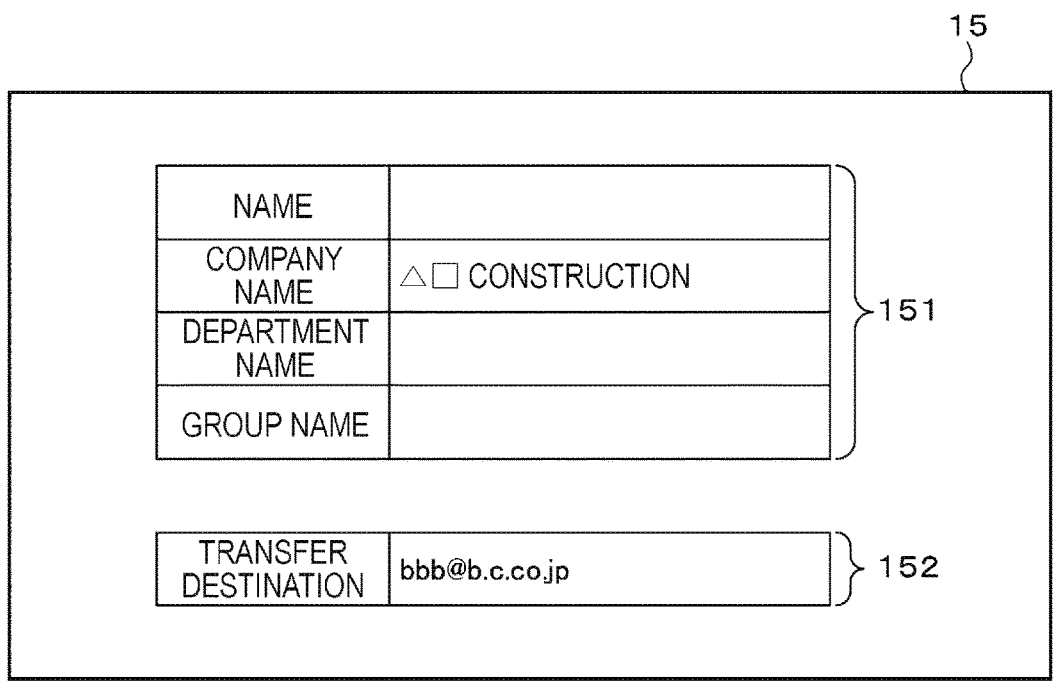
FIG. 4 is a diagram showing an example of a screen displayed by the image forming device according to the first embodiment.
FIG. 5 is a diagram showing retrieval results of a transmission source according to the first embodiment.

FIG. 4 shows an example of a screen displayed on the operation panel 15 in order for the processor 11 to receive an input such as a transfer destination.

As shown in FIG. 4, the processor 11 displays input columns 151 and 152 on the operation panel 15.

The input column 151 receives an input of relevant information related to a transmission source that transfers facsimile data received from there. Here, the input column 151 receives inputs of a "name", a "company name", a "department name", and a "group name" as elements of the relevant information. In addition, the input column 151 may receive an input of at least one element. Here, the input column 151 may receive an input of at least one of the "name", the "company name", the "department name", and the "group name."

The input column 152 receives an input of a transfer destination to which the facsimile data is transferred. The input column 152 receives an input of an email address, a folder, or the like as the transfer destination.

When the processor 11 receives an input of an operation of deciding an input, the processor generates a transfer destination table on the basis of details input to the input columns 151 and 152. That is, the processor 11 stores details input to the input column 151 as relevant information and stores information input to the input column 152 as a transfer destination in the transfer destination table in association with each other.

The processor 11 may appropriately update the transfer destination table in accordance with an operator's operation.

In addition, the processor 11 has a function of receiving facsimile data through the fax interface 21.

For example, a transmission source transmits facsimile data to the address of the image forming device 10. The processor 11 receives the facsimile data from the transmission source through the fax interface 21. That is, the processor 11 acquires the address of the transmission source and a facsimile image.

In addition, the processor 11 has a function of retrieving a transfer destination corresponding to a transmission source of the received facsimile data.

When the facsimile data is received, the processor 11 retrieves relevant information corresponding to the address of the transmission source with reference to the address table.

FIG. 5 shows an example of relevant information retrieved by the processor 11. In the example shown in FIG. 5, the processor 11 acquires "333-333" as an address of a transmission source. The processor 11 retrieves relevant information corresponding to "333-333" from the address table. Here, the processor 11 retrieves two pieces of relevant information.

When the relevant information corresponding to the address of the transmission source is retrieved, the processor 11 retrieves a transfer destination corresponding to the retrieved relevant information with reference to the transfer destination table. That is, the processor 11 retrieves a transfer destination corresponding to at least one element constituting the retrieved relevant information from the transfer destination table.

In the example shown in FIG. 5, the retrieved relevant information includes "Δ☐ construction" as an element. Therefore, the processor 11 retrieves a transfer destination corresponding to "Δ☐ construction". In the transfer destination table shown in FIG. 3, the processor 11 acquires "bbb@b.c.co.jp" as a transfer destination corresponding to "Δ☐ construction".

In addition, the processor 11 has a function of transmitting facsimile data to the retrieved transfer destination.

The processor 11 transmits an address of a transmission source and a facsimile image to the transfer destination. For example, when the transfer destination is an email address, the processor 11 writes the address of the transmission source in the text and transmits an email having the facsimile image attached thereto to the email address. In addition, when the transfer destination is a folder, the processor 11 stores the address of the transmission source and the facsimile image in the folder.

In addition, the processor 11 may write the address of the transmission source in the facsimile image and transmit the facsimile image to the transfer destination.

Next, an operation example of the processor 11 will be described.

Figure 6:
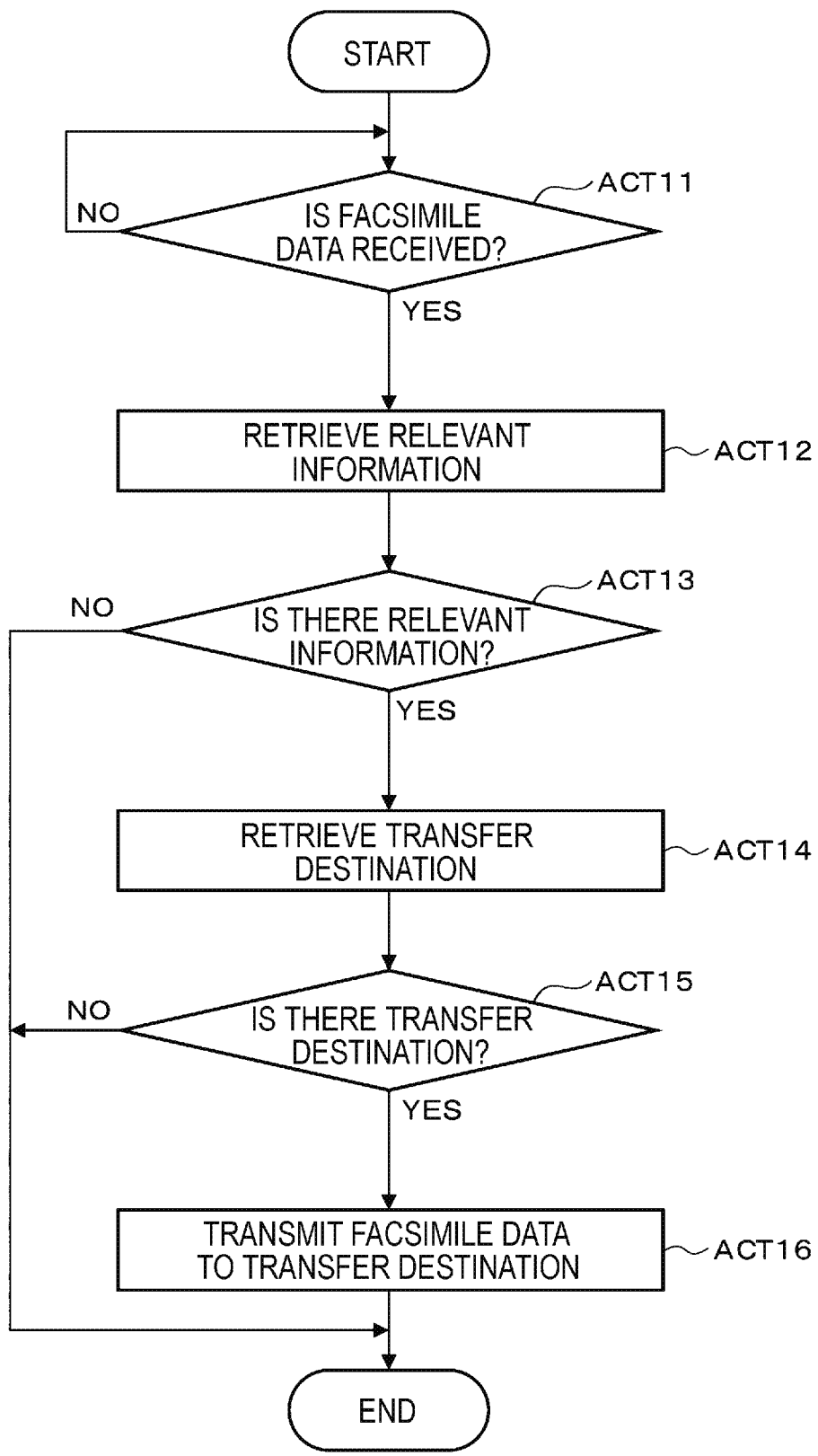
FIG. 6 is a flowchart showing an operation example of the image forming device according to the first embodiment.

FIG. 6 is a flowchart illustrating an operation example of the processor 11.

First, the processor 11 determines whether or not facsimile data is received through the fax interface 21 (ACT11). When it is determined that facsimile data is not received through the fax interface 21 (ACT11, NO), the processor 11 returns to ACT11.

When it is determined that facsimile data is received through the fax interface 21 (ACT11, YES), the processor 11 retrieves relevant information related to a transmission source of the facsimile data with reference to the address table (ACT12).

When the relevant information is retrieved (ACT13, YES), the processor 11 retrieves a transfer destination corresponding to the retrieved relevant information with reference to the transfer destination table (ACT14). When the transfer destination is retrieved (ACT15, YES), the processor 11 transmits the facsimile data to the transfer destination (ACT16).

When the relevant information cannot be found (ACT13, NO), when the transfer destination cannot be found (ACT15, NO), or when facsimile data is transferred to the transfer destination (ACT16), the processor 11 terminates the operation.

Meanwhile, the address table and the transfer destination table may be integrally formed.

In addition, the storage device 13 may store a table in which an address of a transmission source and a transfer destination are associated with each other. In this case, the processor 11 may transfer facsimile data to the transfer destination corresponding to the address of the transmission source.

In addition, the processor 11 may refer to an address table or a transfer destination table stored in an external device.

In addition, when the processor 11 receives facsimile data through the fax interface 21, a facsimile image may be printed using the forming unit 20. In addition, the processor 11 may print the facsimile image in accordance with an operator's operation.

In addition, the processor 11 may acquire an address of a transmission source from the facsimile image. For example, the processor 11 may acquire an address of a transmission source from the facsimile image through an optical character recognition (OCR) process.

When the image forming device configured as described above receives facsimile data, the image forming device acquires a transfer destination corresponding to an address of a transmission source of the facsimile data. The image forming device transfers the facsimile data to the transfer destination. As a result, the image forming device can transfer the facsimile data to a desired transfer destination without needing to be designated from a transmission source.

Second Embodiment

Next, a second embodiment will be described.

A fax system according to the second embodiment is different from the image forming device according to the first embodiment in that a terminal of a user is notified of the reception of facsimile data. Therefore, the other components will be denoted by the same reference numerals and signs, and the description thereof will be omitted.

Figure 7:
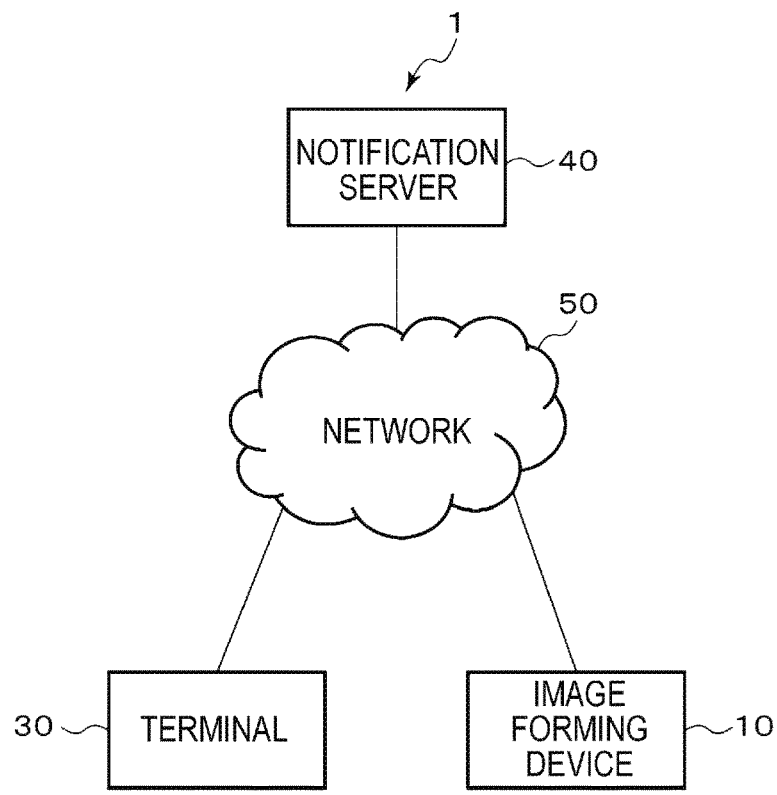
FIG. 7 is a block diagram showing a configuration example of a fax system according to a second embodiment.

FIG. 7 shows a configuration example of a fax system 1 according to the embodiment. As shown in FIG. 7, the fax system 1 includes an image forming device 10, a terminal 30, a notification server 40, a network 50, and the like. In addition, the image forming device 10, the terminal 30 and the notification server 40 are connected to the network 50.

Meanwhile, the fax system 1 may be configured to include a necessary configuration in addition to the configuration as shown in FIG. 7 or may be configured such that a specific configuration is excluded from the fax system 1.

The image forming device 10 is the same as that according to the first embodiment, and thus the description thereof will be omitted.

The terminal 30 is a terminal carried by a user. The terminal 30 is connected to the image forming device 10 and the notification server 40 through the network 50. In addition, the terminal 30 notifies the user of the reception of facsimile data on the basis of information received from the image forming device 10. The terminal 30 will be described later.

The notification server 40 relays communication between the image forming device 10 and the terminal 30. For example, the notification server 40 transmits data received from the image forming device 10 to the terminal 30 through the network 50.

In addition, the notification server 40 issues an identifier. The identifier identifies an application in the terminal 30. That is, the identifier identifies the terminal 30 and the application. In addition, the identifier may identify the terminal 30.

For example, the notification server 40 transmits the identifier to the terminal 30 in response to a request received from the terminal 30.

The network 50 is a communication network for transmitting and receiving data. For example, the network 50 is the Internet. In addition, the network 50 may be an individual communication network.

Next, the terminal 30 will be described.

Figure 8:
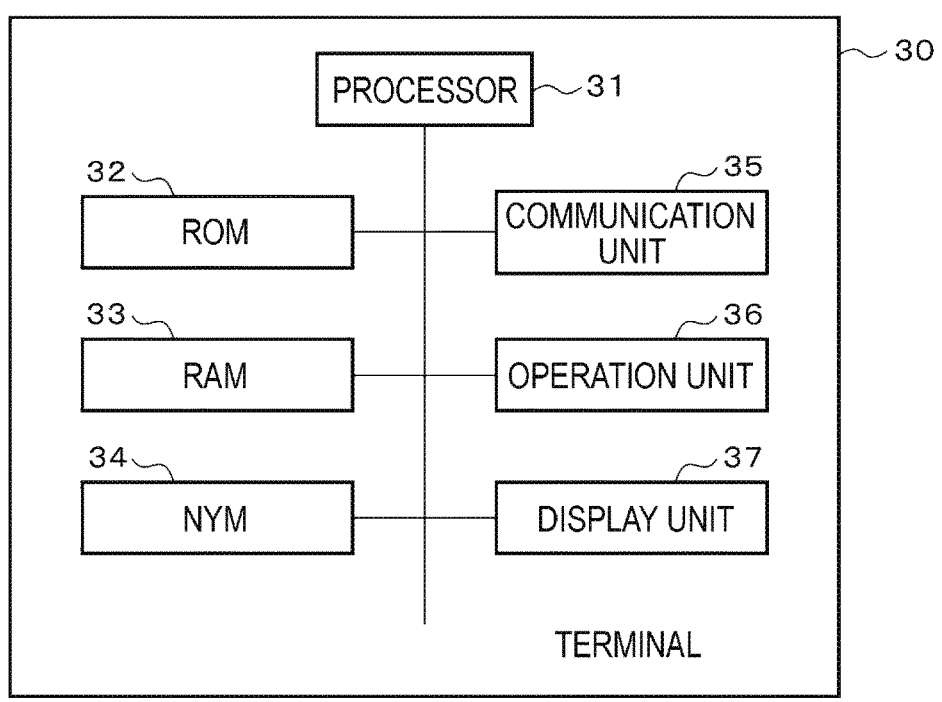
FIG. 8 is a block diagram showing a configuration example of a terminal according to the second embodiment.

FIG. 8 shows a configuration example of the terminal 30 according to the embodiment. FIG. 8 is a block diagram showing a configuration example of the terminal 30. As shown in FIG. 8, the terminal 30 includes a processor 31, a ROM 32, a RAM 33, a NVM 34, a communication unit 35, an operation unit 36, a display unit 37, and the like.

The processor 31, the ROM 32, the RAM 33, the NVM 34, the communication unit 35, the operation unit 36, and the display unit 37 are connected to each other through a data bus or the like.

Meanwhile, the terminal 30 may be configured to include a necessary configuration in addition to the configuration as shown in FIG. 8 or may be configured such that a specific configuration is excluded from the terminal 30.

The processor 31 has a function of controlling the operation of the entire terminal 30. The processor 31 may include an internal cache, various types of interfaces, and the like. The processor 31 realizes various processes by executing programs stored in the internal memory, the ROM 32, or the NVM 34 in advance.

Meanwhile, some of various functions realized by executing a program by the processor 31 may be realized by a hardware circuit. In this case, the processor 31 controls functions executed by the hardware circuit.

The ROM 32 is a non-volatile memory in which a control program, control data, and the like are stored in advance. The control program and the control data stored in the ROM 32 are incorporated in advance according to the specifications of the terminal 30.

The RAM 33 is a volatile memory. The RAM 33 temporarily stores data and the like being processed by the processor 31. The RAM 33 stores various application programs on the basis of a command received from the processor 31. In addition, the RAM 33 may store data necessary for the execution of the application programs, execution results of the application programs, and the like.

The NVM 34 (storage medium) is a non-volatile memory in which data can be written and rewritten. The NVM 34 is constituted by, for example, a hard disk drive (HDD), a solid state drive (SSD), or a flash memory. The NVM 34 stores control programs, applications, various data, and the like in accordance with the purpose of operation of the terminal 30.

The NVM 34 stores an address table and a notification table. The address table is as described above. The notification table will be described later.

The communication unit 35 is an interface for connection to the network 50. That is, the communication unit 35 is an interface for connection to the notification server 40 through the network 50. For example, the communication unit 35 is an interface for supporting wired or wireless LAN connection.

The operation unit 36 receives inputs of various operations from an operator. The operation unit 36 transmits a signal indicating the input operation to the processor 31. The operation unit 36 may be constituted by a touch panel.

The display unit 37 displays image data from the processor 31. For example, the display unit 37 is constituted by a liquid crystal monitor. When the operation unit 36 is constituted by a touch panel, the display unit 37 may be formed integrally with the operation unit 36.

For example, the terminal 30 is a desktop PC, a notebook PC, a tablet PC, a smartphone, a wearable terminal, or the like.

A configuration of the terminal 30 is not limited to a specific configuration.

Next, the notification table will be described.

The notification table shows a transmission source where the terminal 30 outputs a notification when the image forming device 10 receives facsimile data from there. That is, the notification table shows relevant information of the transmission source.

Figures 9, 10:
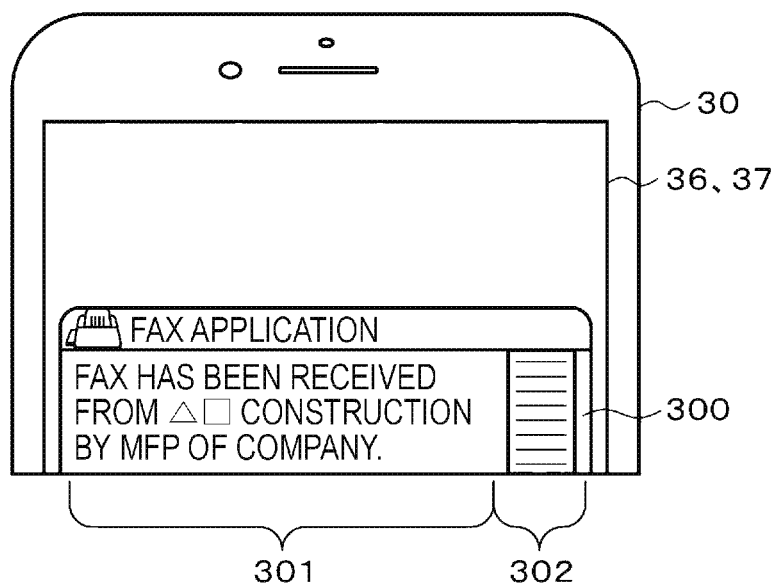
FIG. 9 is a diagram showing an example of a notification table according to the second embodiment.
FIG. 10 is a diagram showing an example of a screen displayed by the terminal according to the second embodiment.

FIG. 9 shows a configuration example of the notification table. As shown in FIG. 9, the notification table stores relevant information.

The relevant information is as described above. For example, the relevant information includes at least one of a "name", a "company name", a "department name", or a "group name".

When facsimile data from a transmission source which is related to the relevant information is received, the notification table shows that the terminal 30 outputs a notification. That is, when the facsimile data from the transmission source which includes elements of the relevant information is received, the notification table shows that the terminal 30 outputs a notification.

For example, the notification table is stored in the NVM through the operation of an application (notification application) for executing the notification of the facsimile data. For example, the processor 31 receives an input of relevant information on a notification application. An operator inputs relevant information to the operation unit 36 with reference to an address table and the like. The processor 31 stores the input relevant information in the notification table.

Meanwhile, the processor 31 may appropriately change the notification table in accordance with an operation of the operator.

Next, functions realized by the image forming device 10 will be described. The functions realized by the image forming device 10 are realized by executing a program stored in the storage device 13 or the like by the processor 11.

The image forming device 10 realizes the following functions in addition to the functions according to the first embodiment.

First, the processor 11 has a function of storing an identifier.

The processor 11 receives the identifier from the terminal 30 through the communication unit 14. The identifier indicates the terminal 30 and a notification application.

For example, the processor 11 receives the identifier from the terminal 30 through ad-hoc connection. In addition, the processor 11 may receive the identifier from the terminal 30 through the network 50.

The processor 11 stores the received identifier in the storage device 13.

In addition, the processor 11 has a function of generating a thumbnail of a facsimile image.

When the processor 11 receives facsimile data through the fax interface 21, the processor generates a thumbnail of a facsimile image. For example, the processor 11 generates the thumbnail by reducing the facsimile image to a predetermined size. In addition, the processor 11 may generate the thumbnail by forming the facsimile image as a monochrome image. A method of generating a thumbnail by the processor 11 is not limited to a specific method.

In addition, the processor 11 has a function of transmitting an address of a transmission source and a thumbnail to the terminal 30 through the communication unit 14.

The processor 11 transmits an address of a transmission source and a thumbnail to the terminal 30 indicated by an identifier stored in the storage device 13.

The processor 11 transmits the address of the transmission source and the thumbnail to the terminal 30 through the notification server 40. For example, the processor 11 transmits the identifier, the address of the transmission source, and the thumbnail to the notification server 40.

The notification server 40 transmits the address and the thumbnail received from the image forming device 10 to the terminal 30. For example, the notification server 40 transmits the address and the thumbnail to the terminal 30 indicated by an identifier received from the image forming device 10.

Next, functions realized by the terminal 30 will be described. The functions realized by the terminal 30 are realized by executing a program (for example, a notification application) stored in the NVM 34 or the like by the processor 31.

First, the processor 31 has a function of transmitting an identifier to the image forming device 10.

Here, the identifier indicates the terminal 30 and the notification application.

For example, the processor 31 transmits a request of the identifier to the notification server 40 through the communication unit 35. The notification server 40 transmits a response including the identifier to the terminal 30 in accordance with the request.

The processor 31 receives a response including an identifier through the communication unit 35. When the response is received, the processor 31 transmits the identifier to the image forming device 10 through the communication unit 35. For example, the processor 31 transmits the identifier to the image forming device 10 through ad-hoc connection. In addition, the processor 31 may transmit the identifier to the image forming device 10 through the network 50.

In addition, the processor 31 has a function of receiving an address of a transmission source of facsimile data and a thumbnail.

The processor 31 receives the address and the thumbnail from the image forming device 10 through the communication unit 35. For example, the processor 31 receives the address and the thumbnail transmitted by the image forming device 10 from the notification server 40 through the communication unit 35.

In addition, the processor 31 has a function of determining whether or not a notification is output on the basis of the address of the transmission source.

When the address of the transmission source and the thumbnail are received, the processor 31 retrieves relevant information corresponding to the address of the transmission source with reference to an address table. An example of an operation of retrieving relevant information is the same as that in the first embodiment.

When relevant information corresponding to an address of a transmission source is retrieved, the processor 31 determines whether or not retrieved relevant information is included in a notification table. That is, the processor 31 determines whether or not at least one element constituting the retrieved relevant information is included in the notification table.

When it is determined that the retrieved relevant information is included in the notification table, the processor 31 determines that a notification is output. On the other hand, when it is determined that the retrieved relevant information is not included in the notification table, the processor 31 determines that a notification is not output.

In addition, the processor 31 has a function of outputting a notification of facsimile data.

When it is determined that a notification is output, the processor 31 outputs a notification indicating that the image forming device 10 receives the facsimile data from the transmission source.

For example, the processor 31 displays a message indicating that the image forming device 10 receives the facsimile data and the received thumbnail on the display unit 37 as a notification.

FIG. 10 shows an example of a screen in which the processor 31 displays a notification on the display unit 37. As shown in FIG. 10, the processor 31 displays a notification 300 on the display unit 37. Here, the processor 31 displays the notification 300 on the display unit 37 as a pop-up screen.

The notification 300 is constituted by display regions 301 and 302.

The display region 301 displays a message indicating that the image forming device 10 (here, an MFP) receives facsimile data from a transmission source. In addition, the display region 301 displays relevant information (for example, "Δ☐ construction") of the transmission source.

The display region 302 displays a thumbnail. The processor 31 may process (for example, reduces) the received thumbnail to display the processed thumbnail on the display region 302.

A configuration of the notification 300 is not limited to a specific configuration.

Meanwhile, when the processor 31 starts up a predetermined application (for example, a notification application), the processor may display the notification 300.

Next, an operation example of the fax system 1 will be described.

First, the processor 31 of the terminal 30 transmits a request for an identifier through the communication unit 35 (ACT21). The notification server 40 receives the request. When the request is received, the notification server 40 transmits a response including the identifier to the terminal 30 in accordance with the request (ACT22).

The processor 31 of the terminal 30 receives the response. When the response is received, the processor 31 transmits the identifier included in the response to the image forming device 10 through the communication unit 35 (ACT23).

The processor 11 of the image forming device 10 receives the identifier through the communication unit 14 (ACT24). When the identifier is received, the processor 11 stores the received identifier in the storage device 13 (ACT24).

Here, it is assumed that the processor 11 receives facsimile data through the fax interface 21 (ACT25). When the facsimile data is received, the processor 11 stores an address of a transmission source, a facsimile image, and the like in the storage device 13 or the like (ACT26). When the address of the transmission source, the facsimile image, and the like are stored in the storage device 13, the processor 11 generates a thumbnail (ACT27).

When the thumbnail is generated, the processor 11 transmits the address of the transmission source and the thumbnail to the notification server 40 (ACT28). The notification server 40 receives the address of the transmission source and the thumbnail from the image forming device 10. When the address of the transmission source and the thumbnail are received from the image forming device 10, the notification server 40 transmits the address of the transmission source and the thumbnail to the terminal 30 (ACT29).

The processor 31 of the terminal 30 receives the address of the transmission source and the thumbnail through the communication unit 35. When the address of the transmission source and the thumbnail are received, the processor 31 determines whether or not a notification is output on the basis of the address of the transmission source (ACT30).

When it is determined that a notification is output (ACT30, YES), the processor 31 outputs the notification to the display unit 37 (ACT31).

When it is determined that the processor 31 does not output a notification (ACT30, NO) or when the processor 11 outputs a notification to the display unit 37 (ACT31), the fax system 1 terminates the operation.

Meanwhile, the processor 11 of the image forming device 10 may not generate a thumbnail. In this case, the processor 11 transmits a facsimile image to the terminal 30. In addition, the processor 31 of the terminal 30 may generate a thumbnail from the facsimile image. In addition, the processor 31 may display the facsimile image on the display unit 37 in accordance with a user's operation.

The fax system configured as described above notifies a terminal carried by a user that an image forming device receives facsimile data. The terminal displays a notification of facsimile data in accordance with a transmission source of the facsimile data. For this reason, the fax system can notify the user of the facsimile data from a specific transmission source.

While certain embodiments have been described, these embodiments have been presented by way of example only, and are not intended to limit the scope of invention. Indeed, the novel device and methods described herein may be embodied in a variety of other forms; furthermore, various omissions, substitutions and changes in the form of the device and methods described herein may be made without departing from the spirit of the inventions. The accompanying claims and their equivalents are intended to cover such forms or modifications as would fall within the scope and spirit of the inventions.

What is claimed is:

1. A reception device, comprising:
an interface configured to receive facsimile data;
a processor configured to transmit, based on an address table and a transfer destination table, a facsimile image of the facsimile data to a transfer destination corresponding to a transmission source transmitting the facsimile data; and
a storage device that stores the address table including an address and relevant information of the transmission source and the transfer destination table including the relevant information and a transfer destination associated with the relevant information, wherein
the processor is further configured to retrieve the relevant information corresponding to the transmission source using the address table, and acquire the transfer destination corresponding to the retrieved relevant information using the transfer destination table.

2. The device according to claim 1, wherein
the relevant information is configured for specifying the transmission source.

3. The device according to claim 1, wherein
the transfer destination is an email address or a folder.

4. A non-transitory storage medium storing a program executed by a processor, the program causing the processor to:
receive an address of a transmission source transmitting facsimile data from a reception device receiving the facsimile data;
retrieve relevant information corresponding to the address of the transmission source using an address table; and
determine whether to output a notification of the facsimile data based on the address.

5. The non-transitory storage medium according to claim 4, wherein
the program causes the processor to determine whether to output the notification of the facsimile data when the retrieved relevant information is included in a notification table indicating at least a portion of the retrieved relevant information.

6. The non-transitory storage medium according to claim 4, wherein
the program causes the processor to receive a thumbnail generated from a facsimile image of the facsimile data from the reception device, and
the notification of the facsimile data to output the thumbnail.

7. The non-transitory storage medium according to claim 5, wherein
the relevant information is configured for specifying the transmission source.

8. The non-transitory storage medium according to claim 4, wherein
the notification of the facsimile data displays a message on a display unit.

9. A reception method, comprising:
receiving an address of a transmission source transmitting facsimile data from a reception device receiving the facsimile data;
retrieving relevant information corresponding to the address of the transmission source using an address table; and
determining whether to output a notification of the facsimile data based on the address.

10. The method according to claim 9, further comprising:
determining whether to output the notification of the facsimile data when the retrieved relevant information is included in a notification table indicating at least a portion of the retrieved relevant information.

11. The method according to claim 9, wherein the relevant information is configured for specifying the transmission source.

12. The method according to claim 9, wherein the notification of the facsimile data displays a message on a display unit.

\* \* \* \* \*